United States Patent [19]

Ando et al.

[11] Patent Number: 5,553,646

[45] Date of Patent: Sep. 10, 1996

[54] HEAVY DUTY PNEUMATIC RADIAL TIRES WITH SPECIFIED TREAD PROFILE

[75] Inventors: Shuji Ando; Yoichi Honbo, both of Kodaira, Japan

[73] Assignee: Bridgestone Corporation, Tokyo, Japan

[21] Appl. No.: 397,926

[22] Filed: Mar. 3, 1995

[30] Foreign Application Priority Data

Mar. 4, 1994 [JP] Japan ................................ 6-034311

[51] Int. Cl.⁶ .................. B60C 3/00; B60C 9/20; B60C 11/00; B60C 11/01
[52] U.S. Cl. .............. 152/209 R; 152/454; 152/526; 152/527; 152/538
[58] Field of Search ................ 152/209 R, 454, 152/527, 538, 526

[56] References Cited

U.S. PATENT DOCUMENTS 5,027,877  7/1991  Tamura et al. .

5,465,773  11/1995  Kadota et al. ................. 152/454

FOREIGN PATENT DOCUMENTS 0318128  5/1989  European Pat. Off. .
0622253  11/1994  European Pat. Off. .
2647716  12/1990  France .

OTHER PUBLICATIONS

European Search Report —Jun. 21, 1995.

*Primary Examiner*—Adrienne C. Johnstone
*Attorney, Agent, or Firm*—Sughrue, Mion, Zinn, Macpeak & Seas

[57] ABSTRACT

A heavy duty pneumatic radial tire has an outer profile of a tread portion in radial section of the tire having a given composite arc shape as a function of the internal structure of the tire, particularly a belt structure including at least two belt layers inclusive of main cross belt layers of steel cords.

3 Claims, 3 Drawing Sheets

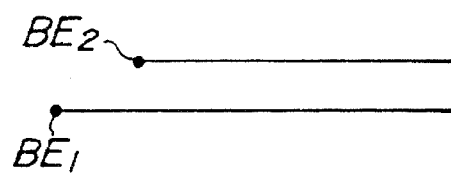
FIG_3
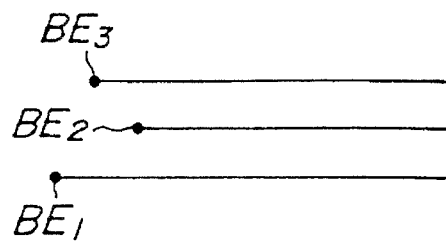
FIG_4
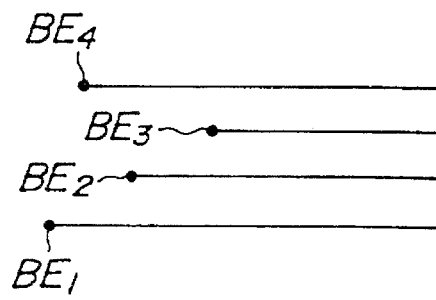
FIG_5
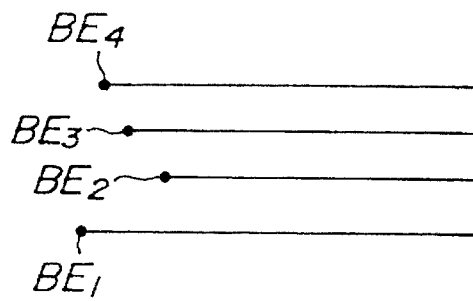
FIG_6

HEAVY DUTY PNEUMATIC RADIAL TIRES WITH SPECIFIED TREAD PROFILE

BACKGROUND OF THE INVENTION

1. Field of the Invention

This invention relates to heavy duty pneumatic tires, and more particularly to a heavy duty pneumatic radial tire for use in vehicles such as a dump truck, a loader, a grader and the like.

2. Description of the Related Art

As an approach for the design of the conventional heavy duty pneumatic tire, an outer profile of a tread crown portion is first designed from a viewpoint that distribution of ground contact pressure and distribution of heat build-up over a whole of a tread are made uniform as far as possible. Then a mold for the vulcanization of the tire is designed, and thereafter an internal structure of the tire, to satisfy different requirements in accordance with applications of the tire is designed assuming the use of such a mold.

That is, the conventional heavy duty pneumatic tire is designed from a viewpoint of ground contact pressure distribution and heat build-up distribution as mentioned above. Therefore, as shown in FIG. 1, the tread crown portion has an outer profile that the outer profile line extends from a widthwise center point C of a tread portion toward each side end E thereof up to a shoulder portion at a single and large crown radius R and then connects to a buttress line at the side end E to form a square shoulder or in the vicinity of the side end E through a somewhat small shoulder radius r to form a round shoulder. The crown radius R is frequently determined by calculating a ratio to a section width of the tire or a ratio of fall d of the side end E in the tread to an outer diameter D of the tire from commercially available existing tires.

Although conventional heavy duty pneumatic tires are designed based on the above idea and technique, there is no consideration for designing the outer profile of the tread crown portion from a viewpoint that a belt durability is enhanced by reducing strain produced at an end of a cross belt as far as possible. As a result, in the prior art a limit to enhancement of belt durability exists even if the structure of the cross belt is changed.

In the heavy duty pneumatic radial tire, the cross belt is frequently comprised of at least two main cross belt layers each containing substantially inextensible steel cords, which have a function of bearing circumferential tension, and at least one belt protection layer containing high-extensible steel cords having an elongation at break of 4.5–8%. Even in this cross belt, belt separation is apt to be caused at an end portion between the main cross belt layers due to interlaminar shearing strain and at a free end portion of the belt protection layer due to tensile strain in cord direction.

Particularly, as the tire becomes flatter, the strain produced at the end portion of the belt becomes larger, so that there are frequently observed failures of breaking the belt portion due to belt separation and the like before the service life of the tire itself is lost by complete wearing of the tread rubber. For this end, it is strongly demanded to enhance the belt durability by reducing the strain produced at the end portion of the belt as far as possible. However, when the outer profile of the tread crown portion is already designed, there is a limit for designing the internal structure of the tire to satisfy requirements for the enhancement of the belt durability.

SUMMARY OF THE INVENTION

It is, therefore, an object of the invention to provide a heavy duty pneumatic radial tire having improved belt durability, particularly a heavy duty pneumatic radial tire comprising at least one carcass ply of radially arranged steel cords and a cross belt of at least two belt layers inclusive of main cross belt layers containing steel cords and having an excellent belt durability.

That is, the invention is to provide a heavy duty pneumatic radial tire having an improved belt durability by adequately designing an outer profile of a tread crown portion in connection with an internal structure of the tire, particularly a belt structure.

According to the invention, there is the provision of a heavy duty pneumatic radial tire comprising a radial carcass containing at least one rubberized cord, a belt comprised of at least two main cross belt layers and at least one protection belt layer and a tread portion, in which the belt has a maximum width corresponding to 60–98% of a tread width, and the main cross belt layers contain a plurality of substantially inextensible cords arranged at a cord angle of 15°–30° with respect to an equatorial plane of the tire, the cords of which layers being crossed with each other with respect to the equatorial plane, the improvement wherein: in a radial section of the tread portion inclusive of a rotating axis of the tire, when a widthwise central point of an outer profile of the tread portion is C, a first point of intersection of a normal line drawn from a rotating axis of the tire and passing through an end of a main cross belt layer having a second wide width among the main cross belt layers (and at which exists a maximum width of a crossed cord region between adjoining main cross belt layers) with the outer profile of the tread portion is $P_0$ and a second point of intersection of a normal line drawn from the rotating axis of the tire and passing through an end of a belt layer having a maximum belt width with the outer profile of the tread portion is $P_1$, the point $P_0$ is located at a region that a first fall height ($h_0$) obtained by subtracting a radius of the point $P_0$ normal to the rotating axis of the tire from ½ of an outer diameter D of the tire is within a range corresponding to 0.45–0.55% of the outer diameter D; and the point $P_1$ is located at a region that a second fall height ($h_1$) obtained by subtracting a radius of the point $P_1$ normal to the rotating axis of the tire from ½ of the outer diameter D is within a range corresponding to 135–200% of a third fall height ($h_2$) obtained by subtracting a radius normal to the rotating axis of the tire of a third point of intersection of an arc with a radius $R_0$ centered on the equatorial plane of the tire and passing through the point $P_0$ and the point C with the normal line passing through the point $P_1$ from ½ of the outer diameter D, and the outer profile of the tread portion in the radial section is a composite arc shape obtained by (1) forming a region between the point C and the point $P_0$ with an arc of the radius $R_0$ or forming a region from the point C to an optional point P between the point C and the point $P_0$ with an arc of the radius $R_0$ and forming a region L between the point P and the point $P_0$ with a straight line, (2) forming a region between the point $P_0$ and the point $P_1$ with an arc of a radius $R_1$ smaller than the radius $R_0$ tangent to the arc of the radius $R_0$ at the point $P_0$, and (3) forming a region between the point $P_1$ and each side edge of the tread portion with an arc of the radius $R_1$ and connecting to a buttress line of the tread portion at the side edge or through an arc of a radius r smaller than the radius $R_1$.

In preferred embodiments of the invention, the at least one protection belt layer contains high-extensible steel cords having an elongation at break of 4.5–8%, and the region between the point P and the point $P_0$ is within a range corresponding to 0–0.4 times of the tread width.

BRIEF DESCRIPTION OF THE DRAWINGS

The invention will be described with reference to the accompanying drawings, wherein:

FIGS. 3 to 6 are schematic views illustrating various embodiments of belt structure, respectively.

DESCRIPTION OF THE PREFERRED EMBODIMENTS

In the heavy duty pneumatic radial tire, the breaking failure of the belt such as belt end separation and the like are frequently observed at end portions of the main cross belt layers, which mainly result from interlaminar shearing strain produced at the end portions of the main cross belt layers as previously mentioned. According to the invention, the outer profile of the tread portion is rendered into the composite arc shape, so that the first fall height $h_0$ of the outer profile of the tread portion at the first intersection point $P_0$ is made smaller than that of the conventional tire. As a result the relative movement of the main cross belt layers can be controlled to reduce the interlaminar shearing strain produced at the end portions of the main cross belt layers.

Also, the breaking failure of the belt is observed at a free end of the belt layer having a maximum width, which mainly results from tensile strain in a cord direction of the belt layer. According to the invention, the second fall height $h_1$ of the outer profile of the tread portion at the second intersection point $P_1$ is made larger than that of the conventional tire, whereby the ground contact pressure can be decreased to reduce the tensile strain.

When the first fall height $h_0$ at the point $P_0$ exceeds 0.55% of the outer diameter D of the tire, the effect of reducing the interlaminar shearing strain produced at the end portions of the main cross belt layers is less, while when it is less than 0.45%, the ground contact pressure in the vicinity of the point $P_0$ becomes high and other failure modes such as uneven wear or the like is undesirably caused.

When the region L between the point P and the point $P_0$ exceeds 0.4 times of the tread width TW, if the arc with the radius $R_1$ satisfying the second fall height $h_1$ is depicted, the arc with the radius $R_1$ becomes strained. Even when the region L is zero, the first fall height $h_0$ can be held at a given level.

When the second fall height $h_1$ at the point $P_1$ is less than 135% of the third fall height $h_2$ of a phantom extended line of the arc with the radius $R_0$, the effect of reducing the tensile strain in the cord direction at the free end of the belt layer having a maximum width is less. When it exceeds 200%, the region near to each side end E of the tread portion does not contact with ground.

Figure 2:
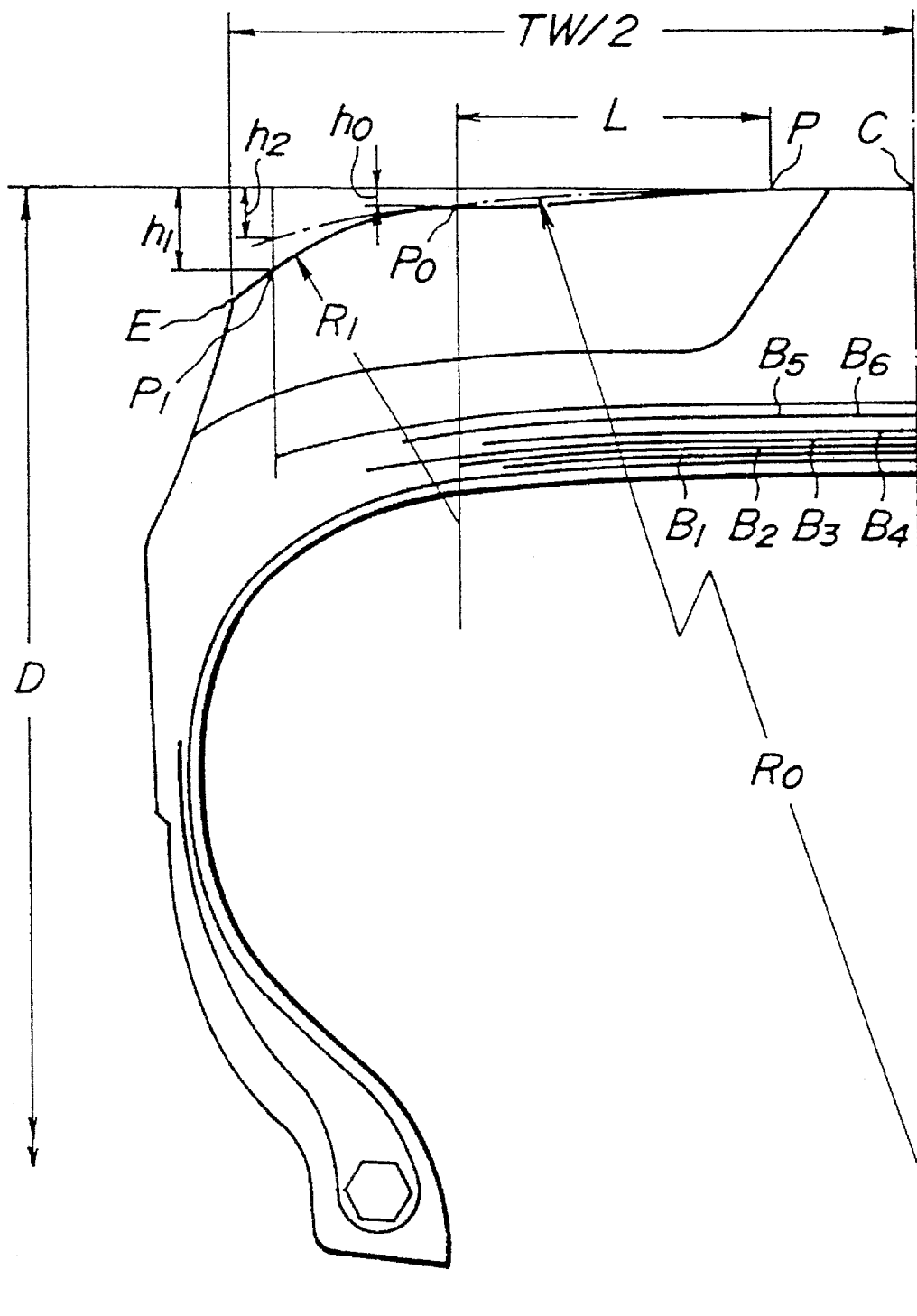
FIG. 2 is a diagrammatically radial-half section view of an embodiment of the heavy duty pneumatic radial tire according to the invention.

FIG. 2 illustrates an embodiment of the heavy duty pneumatic radial tire according to the invention. This tire has a tire size of 50/65R51 and an outer diameter D of 3060 mm and a tread width TW of 1225 mm. In the illustrated embodiment, a belt is comprised of six belt layers $B_1$, $B_2$, $B_3$, $B_4$, $B_5$ and $B_6$, in which the belt layers $B_1$, $B_2$, $B_3$ and $B_4$ are the main cross belt layers and the belt layers $B_5$ and $B_6$ are the protection belt layers, respectively.

In each of the main cross belt layers are used steel cords of (7×7)×0.21+1 structure (tensile strength: 400 kgf/cord, elongation at break: 2.5%) at an end count of 20 cords/5 cm, while steel cords of (3×7)×0.23 structure (tensile strength: 170 kgf/cord, elongation at break: 6.8%) are used at an end count of 18 cords/5 cm in each of the protection belt layers.

The main cross belt layers $B_1$, $B_2$, $B_3$ and $B_4$ have cord angles of 22° upward to the right, 22° upward to the left, 22° upward to the right and 22° upward to the left with respect to the equatorial plane of the tire, and widths of 830 mm, 870 mm, 1000 mm and 850 mm, respectively. Among these main cross belt layers, a maximum cross cord width is located between the adjoining belt layers $B_2$ and $B_3$ in the illustrated embodiment and is 870 mm, which corresponds to 71% of the tread width TW. That is, the belt layer $B_2$ has a second wide width among the main cross belt layers.

The belt layers $B_5$ and $B_6$ as protection belt layers have cord angles of 25° upward to the left and 25° upward to the right with respect to the equatorial plane, and widths of 960 mm and 1150 mm, respectively. Among these belt layers, the belt layer $B_6$ has a maximum belt width of 1150 mm, which corresponds to 94% of the tread width TW.

The first fall height $h_0$ of the outer profile of the tread portion at the point $P_0$ is 16.6 mm, which corresponds to 0.543% of the outer diameter D (=3060 mm) of the tire, so that the radius $R_0$ connecting the point C to the point $P_0$ is 7200 mm.

The third fall height $h_2$ at the third point of intersection of a phantom extended line of the arc with the radius $R_0$ (=7200 mm) is 22.0 mm, while the second fall height $h_1$ of the outer profile of the tread portion at the point $P_1$ is 31.0 mm. This corresponds to 141% of the third fall height $h_2$, so that the radius $R_1$ connecting the point $P_0$ to the point $P_1$ is 500 mm.

A width of the region L from the point $P_0$ to a point P constituting the the straight line of the outer profile between the point C and the point $P_0$ is 300 mm. This corresponds to 69% of a half width of the main cross belt layer $B_2$.

In the illustrated embodiment, the outer profile of the tread portion in the radial section of the tire is a composite arc shape so that the region between the point C and the point P is formed with an arc of the radius $R_0$=7200 mm, the region L between the point P and the point $P_0$ is formed with a straight line, the region between the point $P_0$ and each side end E of the tread portion through the point $P_1$ is formed with an arc of the radius $R_1$=500 mm and connects at the side end E to a buttress line to form a square shoulder.

As seen from the above, the main cross belt layers are required to satisfy the following features (1)–(4):
(1) They are comprised of at least two rubberized cord layers;
(2) The material of the cord is substantially inextensible;
(3) The cords of the layers are crossed with each other with respect to the equatorial plane of the tire; and
(4) The cord angle inclined with respect to the equatorial plane is 15°–30°.

In this connection, the belt layers $B_5$ and $B_6$ do not satisfy the above requirement (2) though the cords of these layers are crossed with each other, so that they are not the main cross belt layers.

The "end of the main cross belt layer having a second wide width" used herein means an end of the main cross belt layer in which exists a maximum width of crossed cord region between adjoining belt layers among the belt layers satisfying all of the above requirements (1)–(4). Such an end of the main cross belt layer is explained with reference to FIGS. 3–6. When the main cross belt layers are a pair of belt layers as shown in FIG. 3, the end of the main cross belt layer is not $BE_1$ but is $BE_2$ because cords are not crossed at a region between $BE_1$ and $BE_2$. When the main cross belt layers are comprised of three belt layers as shown in FIG. 4, the end of the main cross belt layer is not $BE_1$ or $BE_3$ but is $BE_2$. When the main cross belt layers are comprised of four belt layers as shown in FIG. 5, the end of the main cross belt layer is not $BE_1$, $BE_3$ or $BE_4$ but is $BE_2$. When the main cross belt layers are comprised of four belt layers as shown in FIG. 6, the end of the main cross belt layer is not $BE_1$, $BE_2$ or $BE_4$ but is $BE_3$.

Figure 1:
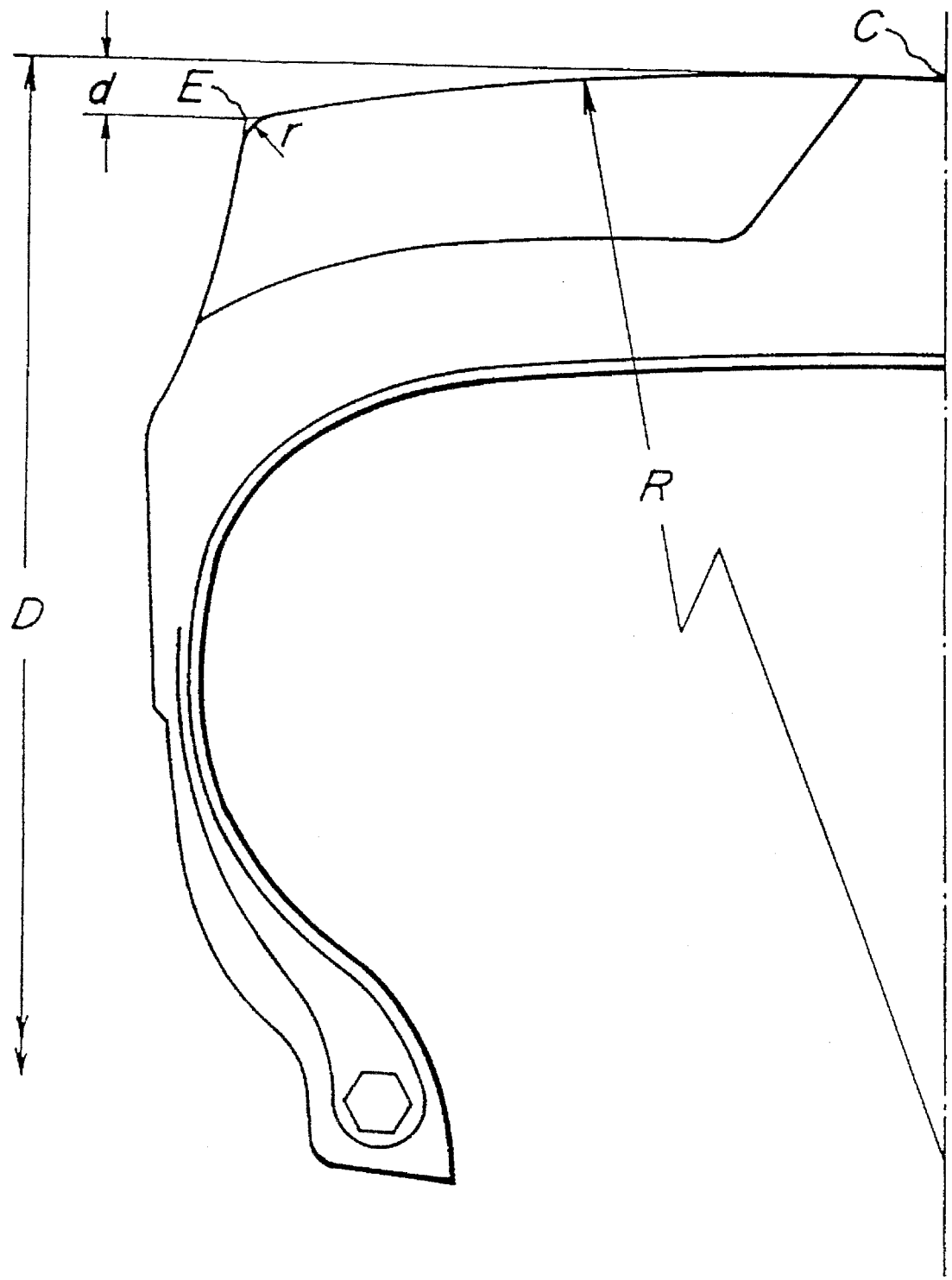
FIG. 1 is a diagrammatically radial-half section view of a conventional heavy duty pneumatic tire.

As a comparative example, there is used the conventional heavy duty pneumatic radial tire shown in FIG. 1. In this case, the outer profile of the tread portion is a single arc shape such that a region ranging from the point C toward each side end E of the tread portion is formed with an arc of a radius R=5000 mm and connects to the buttress line through an arc of a radius r=1700 mm to form a round shoulder. The tire size and the internal structure of the conventional tire are the same as in the above illustrated embodiment.

Then, the interlaminar shearing strain and tensile strain at the end portions of the belt layers are evaluated with respect to the above tire of this invention and the conventional tire under the same conditions to obtain results as shown in Table 1.

TABLE 1

|  | Conventional tire | Invention tire |
| --- | --- | --- |
| First fall height at end of main cross belt layer ($h_0$) | 18.1 mm = D × 0.592% | 16.6 mm = D × 0.543% |
| Interlaminar shearing strain at end of main cross belt layer | 39.1% (100) | 36.5% (93) |
| Second fall height at end of belt layer having maximum belt width ($h_1$) | 32.1 mm = $h_2$ × 120% | 31.0 mm = $h_2$ × 141% |
| Tensile strain at end of belt layer having maximum belt width | +0.541% (stretching) | −0.116% (compression) |

As seen from Table 1, in the heavy duty pneumatic radial tire according to the invention, the interlaminar shearing strain at the end of the main cross belt layer and the tensile strain at the end of the belt layer having the maximum belt width are considerably reduced as compared with those of the conventional heavy duty pneumatic radial tire.

In the heavy duty pneumatic radial tire according to the invention, the outer profile of the tread portion has the composite arc shape as defined above, so that the first fall height $h_0$ of the outer profile at the end of the main cross belt layer is small as compared with that of the conventional tire and hence the relative movement between the main adjoining cross belt layers $B_2$ and $B_3$ can be lessened to reduce the breaking failure of the belt frequently observed at the ends of the main cross belt layers $B_2$, $B_3$ such as belt end separation or the like. Furthermore, the second fall height $h_1$ of the outer profile at the free end of the belt layer $B_6$ having the maximum belt width is large as compared with that of the conventional tire, so that the ground contact pressure in the vicinity of this free end can be decreased to reduce the tensile strain at the free end to thereby reduce the breaking failure of the belt frequently observed at the free end of the belt layer such as belt end separation or the like.

What is claimed is:

1. A heavy duty pneumatic radial tire comprising; a radial carcass containing at least one rubberized cord, a belt comprised of at least two main cross belt layers and at least one protection belt layer and a tread portion, in which the belt has a maximum width corresponding to 60–98% of a tread width, and the main cross belt layers contain a plurality of substantially inextensible cords arranged at a cord angle of 15°–30° with respect to an equatorial plane of the tire, the cords of which layers being crossed with each other with respect to the equatorial plane, the improvement wherein: in a radial section of the tread portion inclusive of a rotating axis of the tire, when a widthwise central point of an outer profile of the tread portion is C, a first point of intersection of a normal line drawn from a rotating axis of the tire and passing through an end of a main cross belt layer having a second wide width among the main cross belt layers, and at which end exists a maximum width of a crossed cord region between adjoining main cross belt layers, with the outer profile of the tread portion is $P_0$ and a second point of intersection of a normal line drawn from the rotating axis of the tire and passing through an end of a belt layer having a maximum belt width with the outer profile of the tread portion is $P_1$, the point $P_0$ is located at a region that a first fall height ($h_0$) obtained by subtracting a radius of the point $P_0$ normal to the rotating axis of said tire from ½ of an outer diameter D of the tire is within a range corresponding to 0.45–0.55% of the outer diameter D; and the point $P_1$ is located at a region that a second fall height ($h_1$) obtained by subtracting a radius of the point $P_1$ normal to the rotating axis of said tire from ½ of the outer diameter D is within a range corresponding to 135–200% of a third fall height ($h_2$) obtained by subtracting a radius normal to said rotating axis of said tire of a third point of intersection of an arc with a radius $R_0$ centered on the equatorial plane of the tire and passing through the point $P_0$ and the point C with the normal line passing through the point $P_1$, from ½ of the outer diameter D and the outer profile of the tread portion in the radial section is a composite arc shape obtained by (1) forming a region between the point C and the Point $P_0$ with an arc of the radius $R_0$ or forming a region from the point C to an optional point P between the point C and the point $P_0$ with an arc of the radius $R_0$ and forming a region L between the point P and the point $P_0$ with a straight line, (2) forming a region between the point $P_0$ and the point $P_1$ with an arc of a radius $R_1$ smaller than the radius $R_0$ tangent to the arc of the radius $R_0$ at the point $P_0$, and (3) forming a region between the point $P_1$ and each side edge of the tread portion with an arc of the radius $R_1$ and connecting to a buttress line of the tread portion at the side edge or through an arc of a radius r smaller than the radius $R_1$.

2. The heavy duty pneumatic radial tire according to claim 1, wherein the at least one protection belt layer contains high-extensible steel cords having an elongation at break of 4.5–8%.

3. The heavy duty pneumatic radial tire according to claim 1, wherein the region between the point P and the point $P_0$ is within a range corresponding to 0–0.4 times of the tread width.

* * * * *